May 27, 1969   H. KEUTH ET AL   3,447,009

MAGNETIZABLE SLOT CLOSURE FOR ELECTRICAL MACHINES

Filed March 15, 1965

United States Patent Office 3,447,009
Patented May 27, 1969

3,447,009
MAGNETIZABLE SLOT CLOSURE FOR ELECTRICAL MACHINES
Heinz Keuth, Alfred Heyer, and Emil Gegner, Nuremberg, Germany, assignors to Siemens Aktiengesellschaft, a corporation of Germany
Filed Mar. 15, 1965, Ser. No. 439,728
Claims priority, application Germany, Mar. 13, 1964,
S 89,996
Int. Cl. H02k 3/48
U.S. Cl. 310—214                                    7 Claims

ABSTRACT OF THE DISCLOSURE

Electric machine structure having slots and winding conductors substantially occupying the slots with the exception of slot space remaining adjacent the slot openings includes a magnetizable slot closure consisting substantially of a plastic mixture of hardenable synthetic resin with iron powder, the closure being formed and hardened in the remaining slot space and filling the space so that it is integral with the electric machine structure. Method of producing the foregoing slot closure includes filling a spackling compound, formed substantially of the hardenable synthetic resin with iron powder, and then hardening the compound within the slot space.

---

Our invention relates to magnetizable slot closures for electrical machines, formed of a mixture of hardenable synthetic plastic with iron powder.

It is known to design such slot closure as solid, preshaped wedges which are shoved into the grooves containing the winding conductors in the laminated stator or rotor stacks of motors and generators. Experience has shown that it is difficult to provide for permanently reliable fastening of the closure wedges in the grooves.

It is an object of our invention to simplify the magnetizable slot closures for electrical machines as to production and insertion of the closure members and their reliable permanent attachment.

According to the invention, the free space remaining near the slot opening when the winding conductors are placed in the groove, is filled by spackling a deformable mixture into it and thereafter curing and thereby hardening the spackling mass inside the groove.

For increasing the mechanical strength of the slot closure, the spackling mass may be given an admixture of fibers and filler substances. It is further preferable to densify the plastic spackling mass in the groove by pressing, tamping or tapping before subjecting the mass to the hardening treatment.

The invention will be further described with reference to embodiments illustrated by way of example on the accompanying drawing in which.

Figure 1:
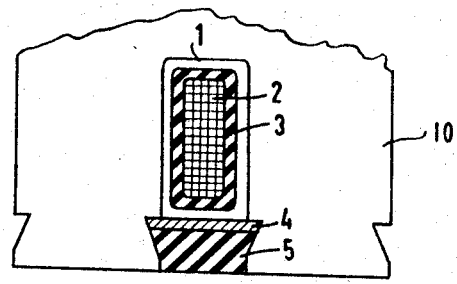
FIG. 1 shows in cross section a first embodiment of a slot closure made according to the invention.

In FIG. 1, one lamination of a grooved stator stack is denoted by 10. Placed into the groove 1 is a winding 2 consisting of one or more individual conductors, which is insulated by a jacket 3 of known type. The winding is sealed from the outside by means of a strip 4 of laminated and pressed insulating material which is seated on shoulders formed by the walls of the groove. The strip 4 may also consist of wood or other suitable material. The remaining groove space is filled with spackling mass 5 and densified by jarring, such as by tapping.

The spackling mass is prepared by intimately mixing a preponderant amount of iron powder with a liquid, hardenable synthetic resin. Since the closure, when finished, must be magnetizable, the amount of iron distributed within the hardened closure should be preponderant, amounting for example to about 70–80% by weight.

A preferred way of preparing the spackling mass is as follows: 80 parts by weight of sponge-iron powder having a median grain size of 60 microns are dried in a furnace at 120° C. 15.6 parts by weight of an epoxide resin on bisphenol-A base, having an epoxide equivalent weight of 190, are mixed with 3.6 parts by weight of a liquid hardener composed of two parts diaminodiphenylmethane and one part of m-phenyldiamine. The hot sponge-iron powder is added to the liquid mass of synthetic resin together with an addition of 0.8 part by weight of glass fibers having a length of 3 to 6 mm. The constituents are then thoroughly mixed.

The resulting dry paste is pressed into the groove and intensively densified. After filling of all grooves, it is generally preferable to let the stator or the machine rest for a few hours. During this period of time the paste becomes sufficiently hard to readily permit any excess to be removed with a scraper. The final hardening is then effected by heating the stator or machine at 130° C. for 5 to 6 hours. After hardening, the spackling mass forms a solid and rigid slot closure of sufficient magnetic conductance and high mechanical strength and stability.

In lieu of the epoxide resin, a polyester resin or other synthetic resin combinations are applicable provided they permit forming a mixture with a sufficient quantity of iron powder.

In lieu of the sponge-iron powder, other types of iron powder may be used, for example carbonyl iron powder. It is advisable to employ largest applicable amounts of iron powder, preferably at least about 80% by weight, for sufficient magnetic conductivity of the spackling mass.

Figure 2:
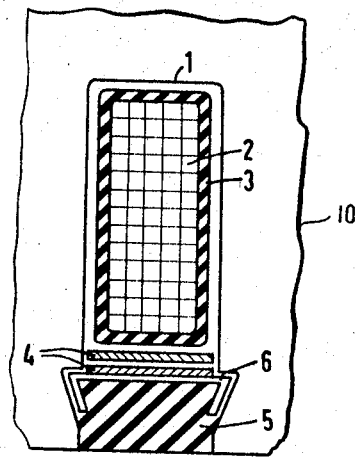
FIG. 2 shows in cross section a second embodiment of such a closure.

The embodiment of the slot closure according to the invention shown in FIG. 2 differs from that of FIG. 1 by being provided with retaining members 6 which are inserted into the groove in longitudinally spaced relation, for example at a distance of 5 cm., from each other. This is done before the spackling mass 5 is forced into the remaining slot space. The retaining members 6 serve to hold the winding conductors in proper position, for example against the bottom of the slot. The retaining members may consist of sheet metal, or of insulating material such as laminated and pressed insulating material. The shape of the retainer members depends upon the shape of the groove. Examples of retaining members are illustrated in FIGS. 3 and 4.

Figure 3:
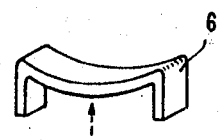
FIG. 3 illustrates in perspective a retaining member which forms part of the closure according to FIG. 2.

According to FIG. 3, the retaining member 6 consists of sheet metal, for example of brass, bronze or aluminum. The member is of arcuate shape. It is placed into the open groove and then deformed by pressure in the direction of the indicated arrow, thus being spread apart and thereby fastened in the groove as shown in FIG. 2.

Figure 4:
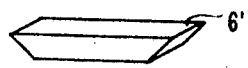
FIG. 4 shows in perspective a different embodiment of a retaining member applicable in lieu of the one shown in FIG. 3.

The retainer member 6' shown in FIG. 4 is preferably made of insulating material and designed to be shoved longitudinally or axially into the groove.

It will be obvious to those skilled in the art that our invention permits of various modifications, particularly with respect to the specific composition of the iron-containing plastic spacking mass, and hence may be given embodiments other than herein illustrated and described, without departing from the essential features of our in-

We claim:

1. In an electric machine structure having slots and winding conductors substantially occupying said slots with the exception of slot space remaining adjacent to the slot openings, the combination of a magnetizable slot closure consisting substantially of a plastic mixture of hardenable synthetic resin with iron powder, said closure being in formed and hardened state in said remaining slot space and filling said space so that it is integral with the electric machine structure.

2. In a slot closure according to claim 1, said synthetic resin in said mixture consisting substantially of thermosetting epoxide resin.

3. In a slot closure according to claim 1, said iron powder in said mixture consisting substantially of sponge-iron powder having a median grain size of 60 micron.

4. In a slot closure according to claim 1, said mixture containing an addition of inorganic filler material.

5. In a slot closure according to claim 1, said mixture of said slot closure containing an addition of fibrous material selected from the group of glass and asbestos.

6. In an electric machine structure having slots and winding conductors substantially occupying said slots with the exeception of slot space reamining adjacent to the slot openings, the combination of a slot closure comprising an insulating partition separating said remaining slot space from the winding conductor in each slot, and a closure body of spackling compound filling said separated remaining slot space, said spackling compound being a plastic mixture of synthetic resin with iron powder in formed and hardened state in the slot space and integral with the electric machine structure.

7. A slot closure according to claim 6, including retaining means disposed between said partition and said spackling compound, said retaining means engaging the slot walls for urging said partition toward the winding conductor.

References Cited

UNITED STATES PATENTS

| | | | |
|---|---|---|---|
| 747,698 | 12/1903 | Geisenhoner | 310—214 |
| 2,134,795 | 11/1938 | Myers | 310—214 |
| 2,745,030 | 5/1956 | Baldwin | 310—214 |
| 2,822,483 | 2/1958 | DeJean et al. | 310—45 |
| 2,846,599 | 8/1958 | McAdam | 310—45 |

MILTON O. HIRSHFIELD, *Primary Examiner.*

L. L. SMITH, *Assistant Examiner.*

U.S. Cl. X.R.

310—45